(12) United States Patent
Okano

(10) Patent No.: US 9,348,588 B2
(45) Date of Patent: May 24, 2016

(54) SEMICONDUCTOR INTEGRATED CIRCUIT AND COMPILER

(71) Applicant: FUJITSU LIMITED, Kawasaki-shi, Kanagawa (JP)

(72) Inventor: Hiroshi Okano, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 414 days.

(21) Appl. No.: 13/947,208

(22) Filed: Jul. 22, 2013

(65) Prior Publication Data

US 2014/0082332 A1    Mar. 20, 2014

(30) Foreign Application Priority Data

Sep. 18, 2012    (JP) .................................. 2012-204856

(51) Int. Cl.

| | | |
|---|---|---|
| *G06F 15/00* | (2006.01) | |
| *G06F 9/30* | (2006.01) | |
| *G06F 9/45* | (2006.01) | |
| *G06F 9/38* | (2006.01) | |
| *G06F 1/32* | (2006.01) | |
| *G06F 15/78* | (2006.01) | |

(52) U.S. Cl.
CPC ............ *G06F 9/3001* (2013.01); *G06F 1/3203* (2013.01); *G06F 8/41* (2013.01); *G06F 9/30083* (2013.01); *G06F 9/3869* (2013.01); *G06F 15/7867* (2013.01); *Y02B 60/1225* (2013.01)

(58) Field of Classification Search
CPC ....................... G06F 15/7867; Y02B 60/1225
See application file for complete search history.

(56) References Cited

U.S. PATENT DOCUMENTS

2007/0143577 A1*  6/2007  Smith ................. G06F 15/7867
                                                                      712/10

FOREIGN PATENT DOCUMENTS

| JP | 1-155459 | 6/1989 |
|---|---|---|
| JP | 2003-296123 | 10/2003 |
| JP | 2004-318502 | 11/2004 |
| JP | 2005-235203 | 9/2005 |

* cited by examiner

*Primary Examiner* — Zachary K Huson
(74) *Attorney, Agent, or Firm* — Fujitsu Patent Center

(57) ABSTRACT

A semiconductor integrated circuit includes: a floating point arithmetic unit that includes circuit resources over which power saving control is performed, and executes a floating point arithmetic operation; a power-control instruction control unit that receives a pre-access instruction corresponding to a floating point arithmetic operation instruction, and invalidates stepwise the power saving control over the circuit resources included in the floating point arithmetic unit to operate a part of the circuit resources in the floating point arithmetic unit; and a control unit that causes the floating point arithmetic unit to execute the floating point arithmetic operation, wherein before execution of the floating point arithmetic operation in the floating point arithmetic unit, power consumption is previously increased by the pre-access instruction.

7 Claims, 11 Drawing Sheets

PRE-ACCESS INSTRUCTION

ACCESS END INSTRUCTION

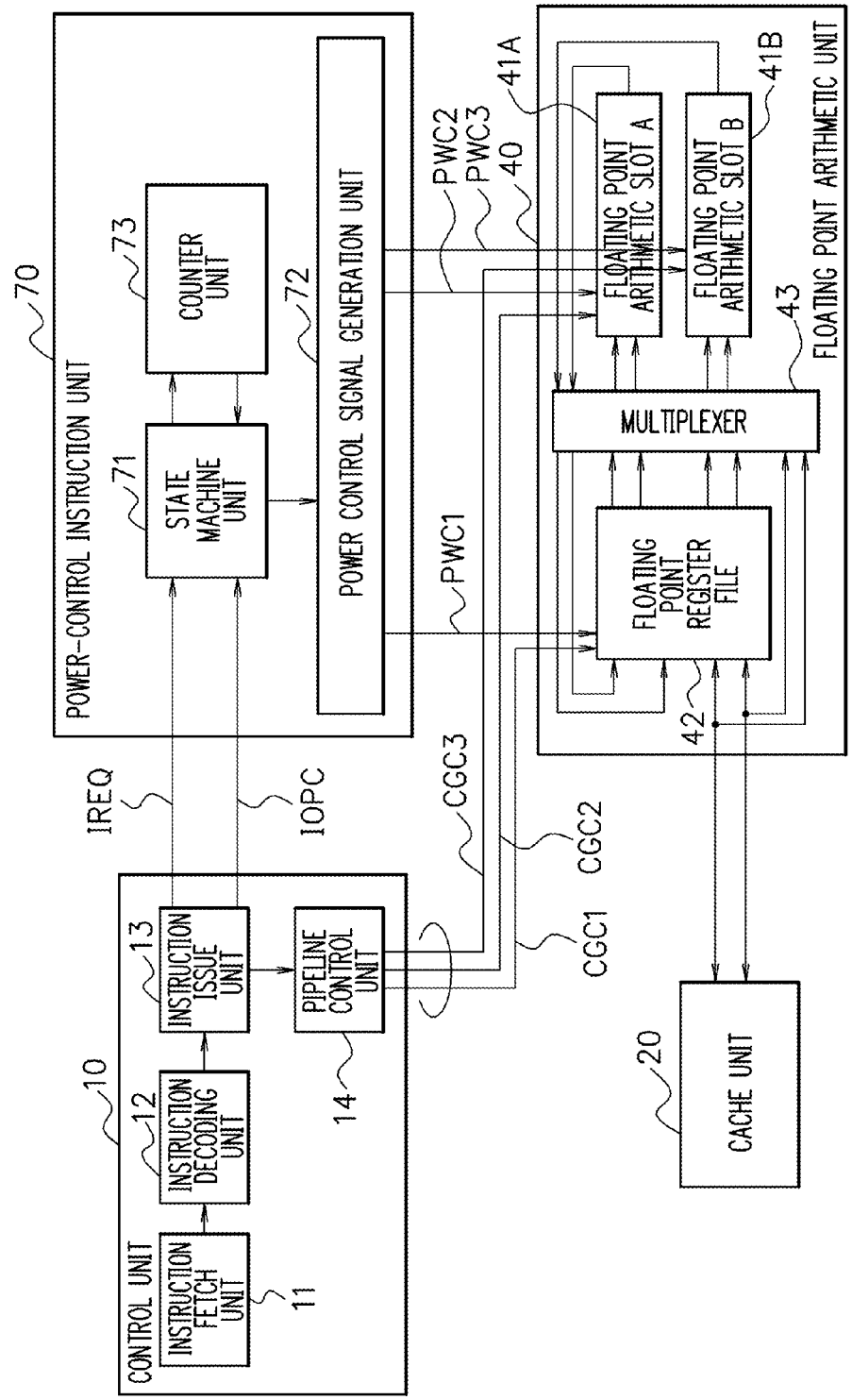
F I G. 3

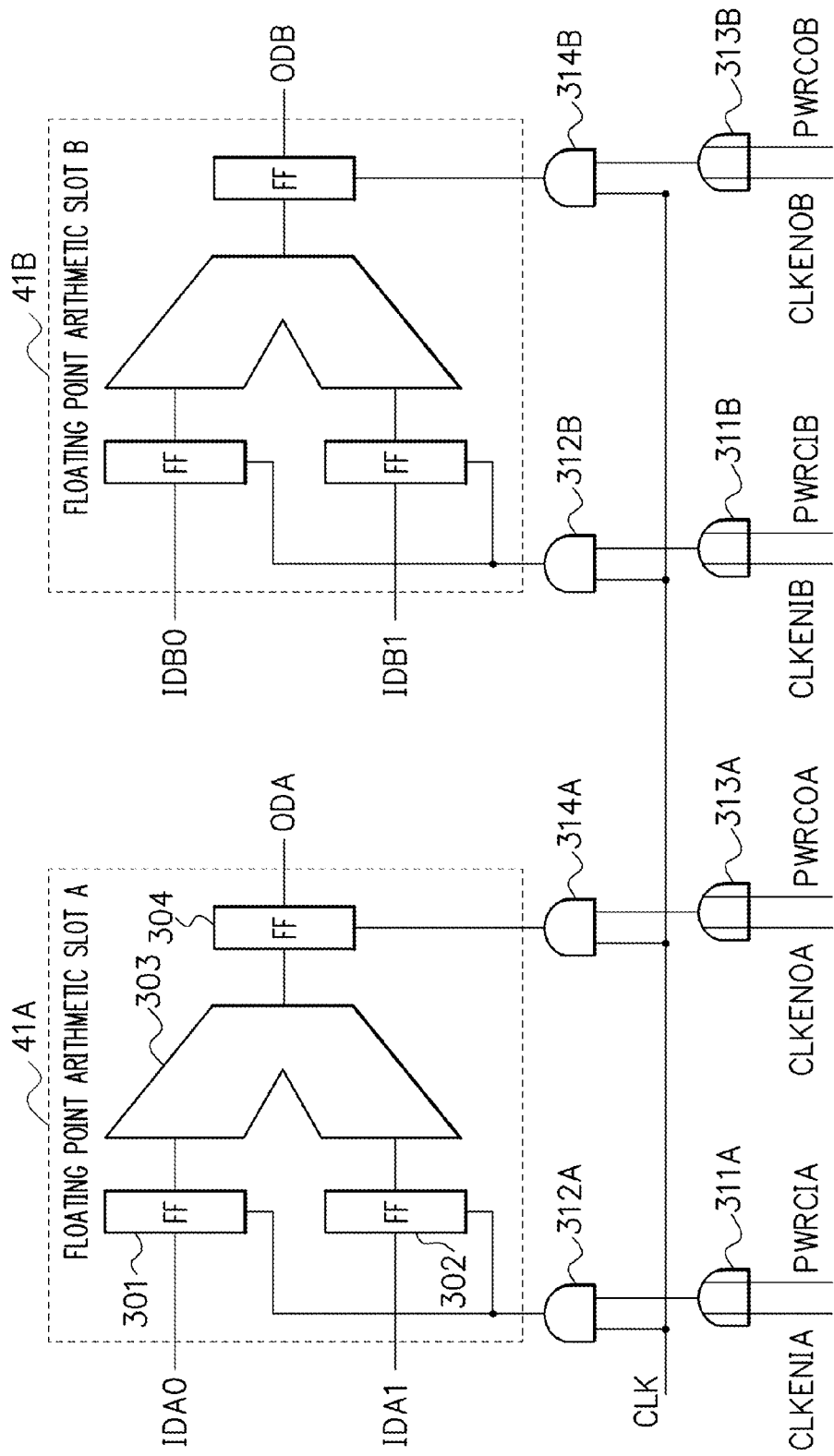
F I G. 5

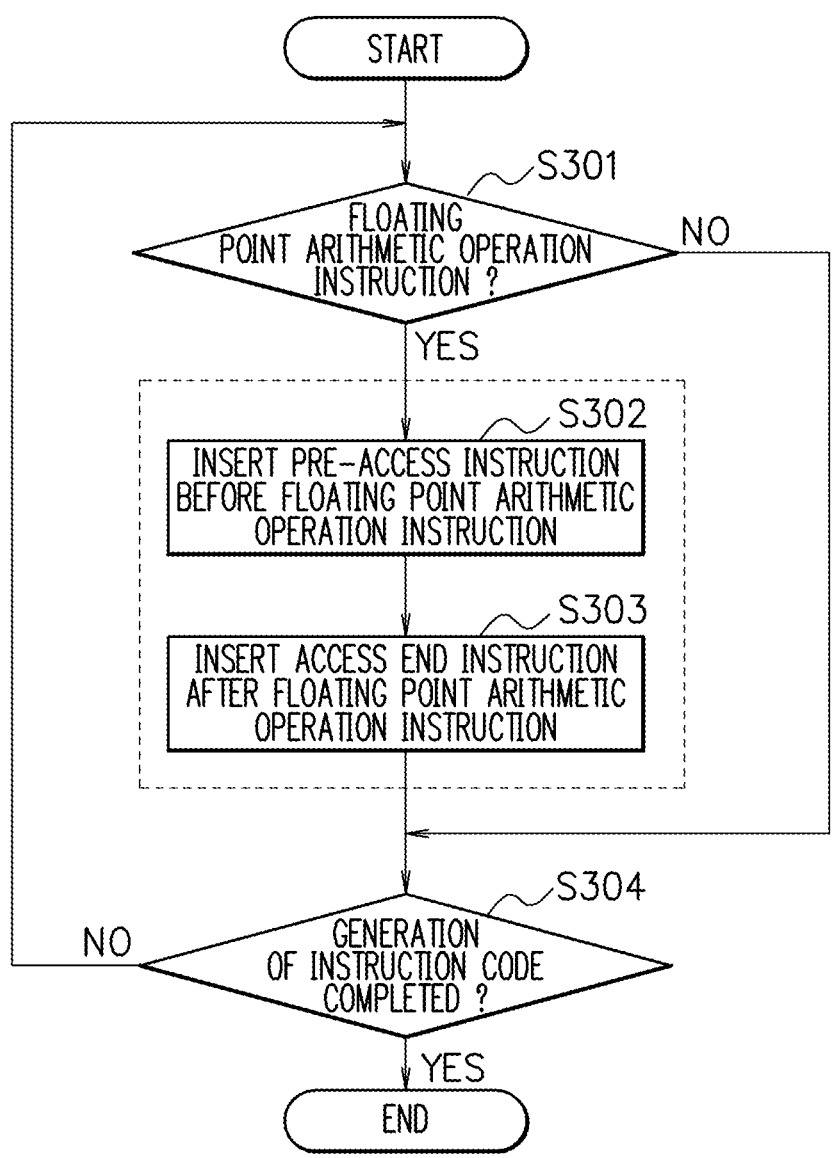

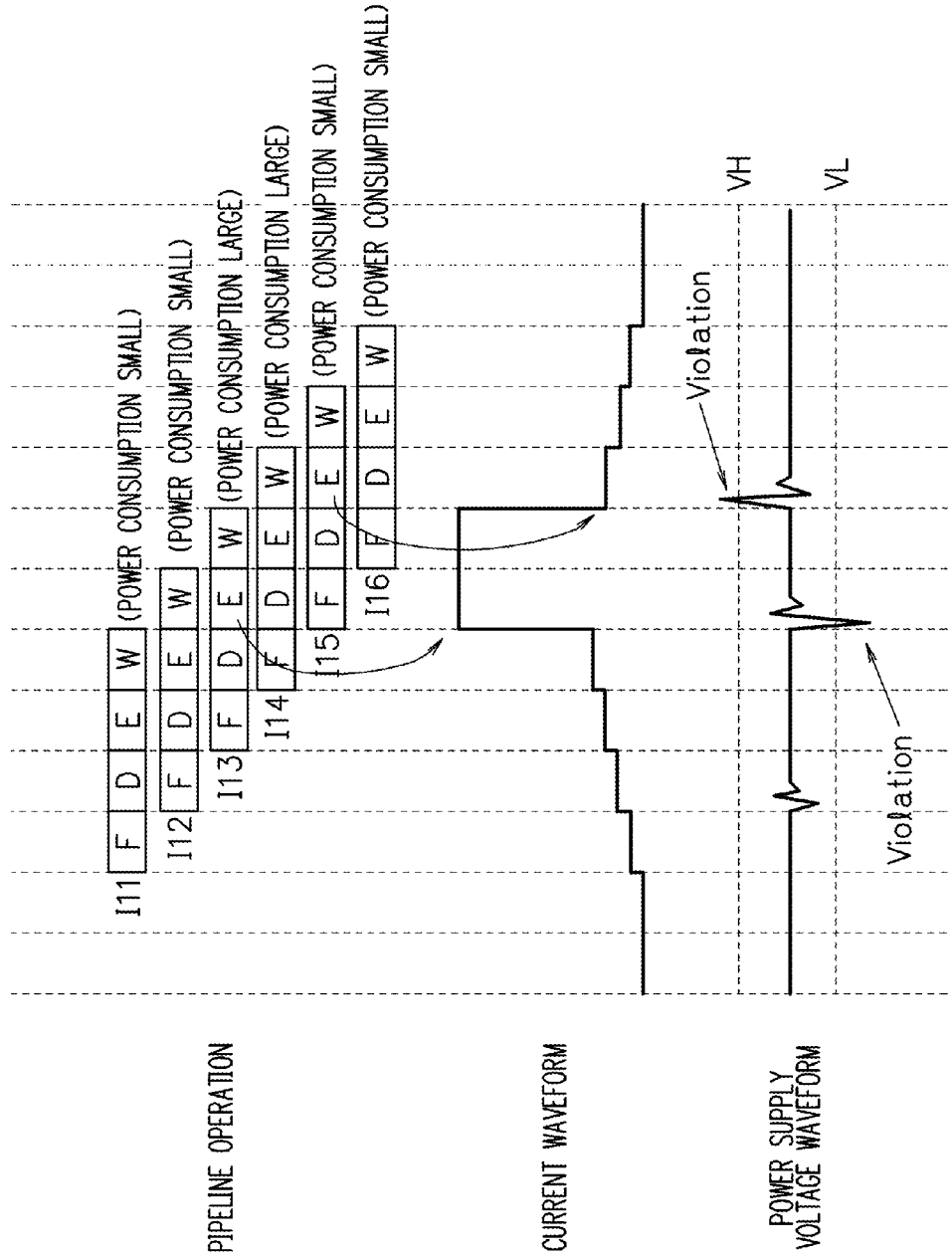

SEMICONDUCTOR INTEGRATED CIRCUIT AND COMPILER

CROSS-REFERENCE TO RELATED APPLICATION

This application is based upon and claims the benefit of priority of the prior Japanese Patent Application No. 2012-204856, filed on Sep. 18, 2012, the entire contents of which are incorporated herein by reference.

FIELD

The embodiment discussed herein is directed to a semiconductor integrated circuit and a compiler.

BACKGROUND

In a semiconductor integrated circuit, a technique is generally used which suppresses operations of unused circuits by clock gating, chip enable control over a RAM (Random Access Memory) macro, or the like so as to reduce the power consumption for low power consumption. For example, the clock of a specific circuit block is controlled such that when the circuit block is not used, the supply of clock and power is blocked, whereas when the circuit block is used, the supply of clock and power is performed to thereby reduce the power consumption.

However, when the low power consumption is achieved by these techniques, the difference between the maximum power and the minimum power to be consumed by the semiconductor integrated circuit increases to also increase the difference between the maximum current and the minimum current flowing through the circuit. This leads to an increase in power supply noise to cause malfunction of the circuit or interference with positive introduction of the low power consumption technique in the semiconductor integrated circuit. Further, when an instruction of performing a plurality of arithmetic operations by one instruction such as an SIMD (Single Instruction Multiple Data) instruction is executed, a rapid current fluctuation occurs because circuit resources such as a plurality of arithmetic circuits, RAM macro, register file and so on are simultaneously operated. In a power supply system composed of a die, package, and board, when a current fluctuation occurs in a frequency band with high impedance, the power supply noise increases. For measures to suppress the power supply noise, a decoupling capacitor is mounted on the die, package, or board so that even when the current fluctuation occurs, the power noise takes an allowable value or less.

FIG. 12 is a diagram illustrating a pipeline operation in a conventional processor and examples of a current waveform and a power supply voltage waveform during the operation. In FIG. 12, a four-stage pipeline operation of an instruction fetch stage F, an instruction decode stage D, an arithmetic operation execution stage E, and a register write stage W is illustrated as an example. When instructions I11, I12, I15, I16 with small power consumption such as a logical arithmetic operation and instructions I13, I14 with large power consumption such as a floating point arithmetic operation and an SIMD instruction are executed in a mixed manner, the current increases in a period when the arithmetic operation with large power consumption is executed. Therefore, the power supply noises are generated as illustrated in the power supply voltage waveform in FIG. 12 so that the power supply voltage exceeds an allowable upper limit VH and an allowable lower limit VL in some cases. In this case, the decoupling capacitor is mounted inside a processor, on a package or the like in the conventional processor to suppress the power supply noise.

The large current fluctuation may occur in the following case. For example, when a transistor with low threshold voltage and large leak current though high speed is used in an arithmetic circuit for high-speed performance in a processor, the following control is possibly performed in order to reduce the power consumption. Power gating is performed only on the arithmetic circuit so as to suppress the leak current in a period when the arithmetic circuit is not used, or clock gating is performed on a register on a path for supplying data to the arithmetic circuit or data gating is performed on a data path to prevent waste operations of the arithmetic circuit so as to suppress the dynamic power in a period when the arithmetic circuit is not used. In these cases, if the setting operation and the release operation of the power gating, clock gating and the data gating are rapid, a rapid current fluctuation occurs to damage the power integrity (power supply quality), possibly causing malfunction of the circuit.

A technique is proposed which generates current using a circuit controlling a circuit current other than a circuit used for actual data processing and data storage to suppress the current fluctuation at switching power (for example, see Patent Document 1). Further, an instruction conversion technique such as a compiler or the like that analyzes an instruction program using a table storing information relating to whether or not circuit resources operate depending on kinds of instructions and inserts a power control instruction based on an analysis result, and a technique of determining an instruction to be executed by the processor and limiting current supply to a circuit block that is not used at execution of the instruction are proposed (see, for example, Patent Documents 2 to 4).

[Patent Document 1] Japanese Laid-open Patent Publication No. 2005-235203
[Patent Document 2] Japanese Laid-open Patent Publication No. 2004-318502
[Patent Document 3] Japanese Laid-open Patent Publication No. 2003-296123
[Patent Document 4] Japanese Laid-open Patent Publication No. 01-155459

As described above, the power supply noise due to current fluctuation is suppressed by mounting the decoupling capacitor on the die, package, or board in the conventional semiconductor integrated circuit. However, when advancement of miniaturization in technology promotes low voltage and large current in the future to increase the current fluctuation amount per unit time in the semiconductor integrated circuit, the capacity of the capacitor for suppressing the power supply noise also increases in the above-described conventional countermeasure. The increase in capacity of the capacitor leads to an increase in die size and an increase in the number of capacitor parts mounted on the package or board, causing an increase in cost.

SUMMARY

An aspect of a semiconductor integrated circuit includes: an arithmetic unit that executes predetermined processing according to an instruction and includes a plurality of circuit resources therein over which power saving control is performed; a first control unit that receives a second instruction corresponding to a first instruction for which processing is executed using the circuit resources of the arithmetic unit, and operates a part of the circuit resources to be used in the processing according to the first instruction; and a second control unit that receives the first instruction and causes the arithmetic unit to execute the processing according thereto.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram for explaining a mechanism relating to power control in this embodiment;

FIG. 5 is a diagram illustrating an example of a clock control over arithmetic slots in this embodiment;

FIG. 11 is a flowchart illustrating a processing example of the compiler in this embodiment; and FIG. 12 is a diagram illustrating example of a pipeline operation in a conventional processor, a current waveform, and a power supply voltage waveform.

DESCRIPTION OF EMBODIMENTS

Hereinafter, an embodiment will be described with reference to the drawings.

Figure 1:
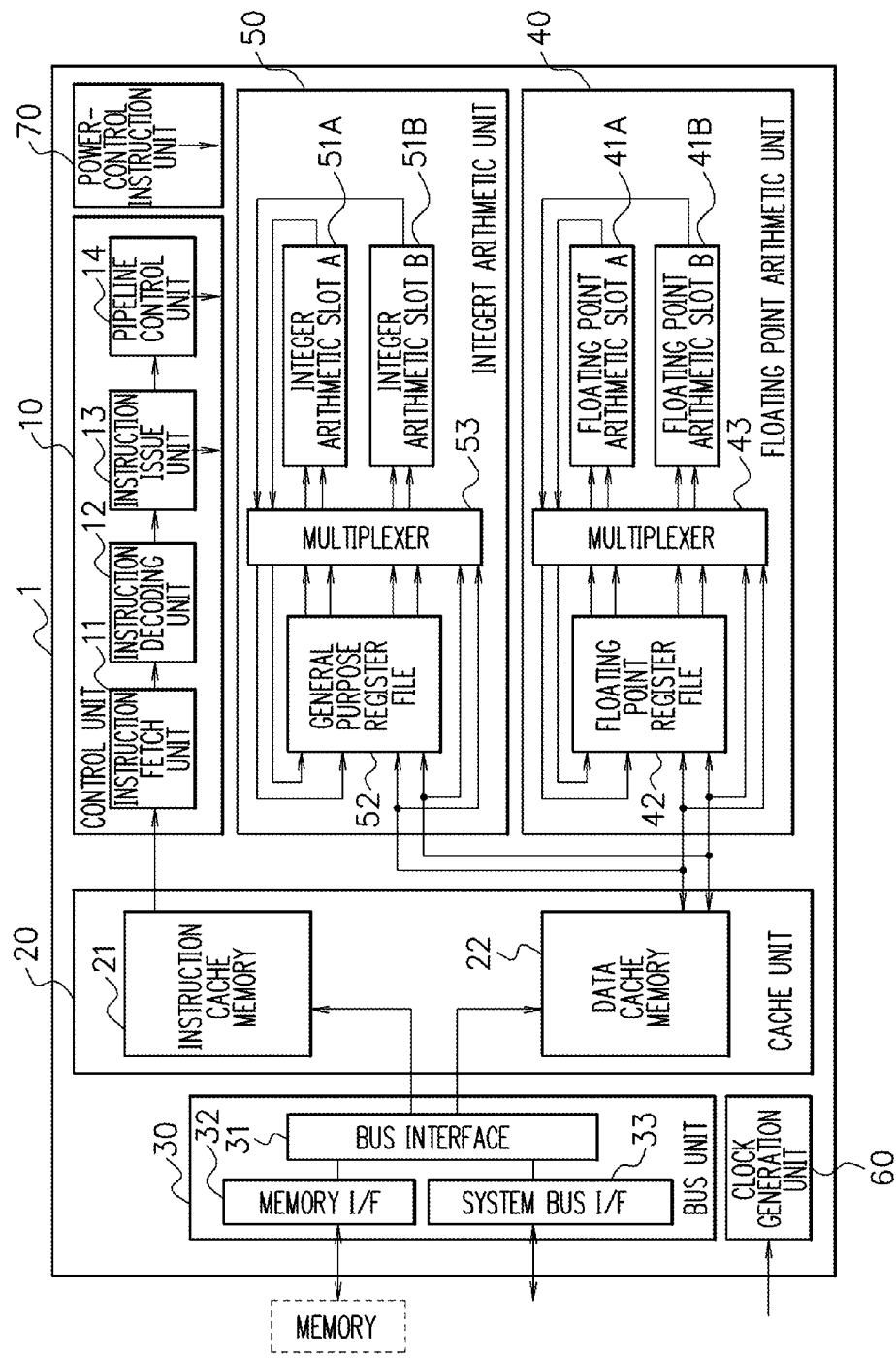
FIG. 1 is a diagram illustrating a configuration example of a semiconductor integrated circuit in an embodiment.

FIG. 1 is a block diagram illustrating a configuration example of a processor as a semiconductor integrated circuit in this embodiment. A processor 1 in this embodiment performs power saving control, for example, utilizing clock gating. The processor 1 has a control unit 10, a cache unit 20, a bus unit 30, a floating point arithmetic unit 40, an integer arithmetic unit 50, a clock generation unit 60, and a power-control instruction control unit 70.

The control unit 10 controls the processor. The control unit 10 has an instruction fetch unit 11, an instruction decoding unit 12, an instruction issue unit 13, and a pipeline control unit 14. The instruction fetch unit 11 reads (fetches) an instruction from an instruction cache memory 21 and outputs the instruction to the instruction decoding unit 12. The instruction decoding unit 12 decodes the supplied instruction and outputs the decoded instruction to the instruction issue unit 13. The instruction issue unit 13 instructs the arithmetic units 40, 50 and the like in the processor 1 to execute the decoded instruction. The pipeline control unit 14 controls a pipeline relating to a floating point arithmetic operation, an integer arithmetic operation and the like, and outputs a clock gating control signal to control clock gating.

The cache unit 20 has the instruction cache memory 21 and a data cache memory 22. The instruction cache memory 21 stores an instruction inputted from an external memory (main storage device) or the like via the bus unit 30. The data cache memory 22 stores data inputted from an external part via the bus unit 30 and stores data to be outputted to the external part. The bus unit 30 is an interface unit with respect to the external memory (main storage device) and a system bus. The bus unit 30 has a bus interface 31 of an internal bus, a memory interface 32, and a system bus interface 33.

The floating point arithmetic unit 40 executes the floating point arithmetic operation according to control by the control unit 10. The floating point arithmetic unit 40 has floating point arithmetic slots 41A, 41B, a floating point register file 42, and a multiplexer 43. Each of the floating point arithmetic slots 41A, 41B has an arithmetic circuit and performs the floating point arithmetic operation using the supplied data and outputs an operation result. The floating point register file 42 holds data to be used for the floating point arithmetic operation and the operation result. For execution of the floating point arithmetic operation, the multiplexer 43 controls data to be inputted into the floating point arithmetic slots 41A, 41B and the floating point register file 42.

The integer arithmetic unit 50 executes the integer arithmetic operation according to control by the control unit 10. The integer arithmetic unit 50 has integer arithmetic slots 51A, 51B, a general purpose register file 52, and a multiplexer 53. Each of the integer arithmetic slots 51A, 51B has an arithmetic circuit and performs the integer arithmetic operation using the supplied data and outputs an operation result. The general purpose register file 52 holds data to be used for the integer arithmetic operation and the operation result. For execution of the integer arithmetic operation, the multiplexer 53 controls data to be inputted into the integer arithmetic slots 51A, 51B and the general purpose register file 52.

Note that an example in which the floating point arithmetic unit 40 has the two floating point arithmetic slots 41A, 41B and the integer arithmetic unit 50 has the two integer arithmetic slots 51A, 51B is illustrated in FIG. 1, but the processor is not limited to this example. The number of floating point arithmetic slots and the number of integer arithmetic slots are arbitrary.

The clock generation unit 60 generates a clock to be used in the processor 1. The power-control instruction control unit 70 outputs a power control signal in response to a power control instruction relating to control of power consumption to invalidate or validate stepwise the power saving control over circuit resources such as the arithmetic units 40, 50 and so on. The power control instruction includes a pre-access instruction that causes a part of the circuit resources to perform dummy operation to thereby invalidate stepwise the power saving control over the circuit resource, and an access end instruction that validates stepwise the power saving control over the circuit resource. The pre-access instruction and the access end instruction correspond to an instruction with large power consumption. Note that a floating point arithmetic operation instruction will be explained below as one example of the instruction with large power consumption, but the instruction with large power consumption is not limited to this example. When there are a plurality of instructions with large power consumption such as the floating point arithmetic operation instruction and a load instruction, the power-control instruction control unit 70 can hold the pre-access instruction and the access end instruction corresponding to each of the instructions.

Figure 2A:
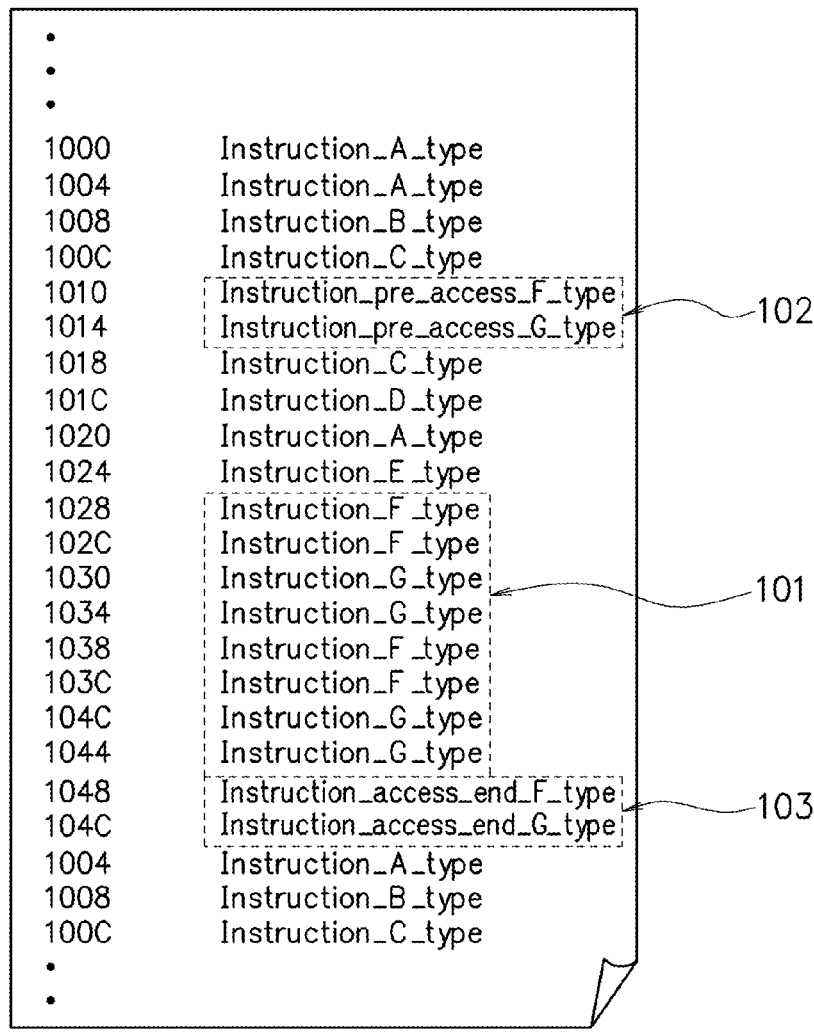
FIG. 2A is a chart illustrating an example of instruction codes in this embodiment.

FIG. 2A is a chart illustrating an example of instruction codes in this embodiment. In FIG. 2A, each of Instruction_A_type, Instruction_B_type, Instruction_C_type, Instruction_D_type, and Instruction_E_type is an instruction with small power consumption. Further, each of Instruction_F_type and Instruction_G_type is an instruction with large power consumption using circuit resources that possibly damage power integrity. Instruction_pre_access_F_type is the pre-access instruction corresponding to the instruction Instruction_F_type, and Instruction_access_end_F_type is the access end instruction corresponding to the instruction Instruction_F_type. Further, Instruction_pre_access_G_type is the pre-access instruction corresponding to the instruction Instruction_G_type, and Instruction_access_end_G_type is the access end instruction corresponding to the instruction Instruction_G_type.

In this embodiment, prior to execution of an instruction 101 with large power consumption, a pre-access instruction 102 corresponding to the instruction is previously executed. Further, for execution of the instruction 101 with large power consumption, when the interval from the execution to next execution of the same instruction is equal to or more than a set value, an access end instruction 103 corresponding to the instruction is executed after the execution of the instruction. In other words, prior to execution of the instruction causing a rapid current fluctuation such as using circuit resources that possibly damage the power integrity, the pre-access instruction corresponding to the instruction is previously executed to gradually increase the power consumption. This makes it possible to decrease the current fluctuation when executing the instruction causing a rapid current fluctuation, thereby ensuring the power integrity. Further, when the execution of the instruction causing a rapid current fluctuation is ended, the access end instruction corresponding to the instruction is executed to decrease the power consumption stepwise so as to suppress a rapid current fluctuation, thereby ensuring the power integrity. Further, by executing the pre-access instruction several cycles before, that is, at a point in time separated to a certain degree from the point in time when executing the instruction with large power consumption, the power integrity can be ensured without generation of penalty in performance nor deterioration of performance. Note that the execution of the pre-access instruction and the access end instruction does not change the state of the processor observable from software such as the status of the processor, memory contents, data in the register.

The amount of increase in power consumption increased by the pre-access instruction is desirable to be half of the amount of power increased when the instruction is executed without execution of the pre-access instruction, in order to decrease the amount of current fluctuation generated by the execution of the pre-access instruction itself and a subsequent instruction corresponding to the pre-access instruction from a viewpoint of cost for reducing the quantity of decoupling capacitors mounted. This makes it possible to halve the amount of current fluctuation generated when the pre-access instruction and the subsequent instruction corresponding to the pre-access instruction are executed, thereby halving the amount of voltage fluctuation due to power supply noise. From a viewpoint of power consumption, the amount of increase in power consumption is desirably as small as possible in the case where even if the amount of increase in power consumption increased by the pre-access instruction is decreased, the amount of current fluctuation generated by the execution of the corresponding subsequent instruction is satisfied the allowable value of the power supply noise. The amount of power consumption decreased by the access end instruction is desirable to be half of the amount of power decreased after execution of the instruction without executing the access end instruction from a viewpoint of cost, and is desirable to be decreased as much as possible from a viewpoint of power consumption.

Figure 2B:
FIG. 2B is a chart illustrating an example of a pre-access instruction.
Figure 2C:
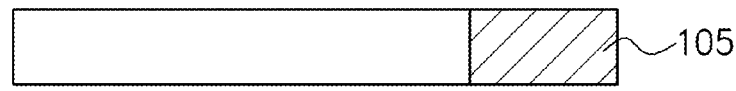
FIG. 2C is a chart illustrating an example of an access end instruction.

Here, as illustrated in FIG. 2B, the pre-access instruction may include a field 104 which can designate circuit resources and modules which are operated by the instruction, that is, whose power saving control is invalidated. As illustrated in FIG. 2C, the access end instruction may include a field 105 which can designate circuit resources and modules whose operations are stopped by the instruction, that is, whose power saving control is validated. It is also adoptable that in the field 104 of the pre-access instruction and the field 105 of the access end instruction, instructions corresponding to the respective instructions can be designated.

FIG. 3 is a diagram for explaining a mechanism relating to power control in this embodiment. FIG. 3 illustrates, as an example, a mechanism relating to power control about the floating point arithmetic operation. In FIG. 3, the same components as those illustrated in FIG. 1 will be denoted by the same reference signs, and a duplicated description thereof will be omitted. As illustrated in FIG. 3, the power-control instruction control unit 70 includes a state machine unit 71, a power control signal generation unit 72, and a counter unit 73.

The pipeline control unit 14 generates and outputs clock gating control signals CGC1, CGC2, CGC3 for performing power saving control utilizing clock gating according to the output of the instruction issue unit 13. The clock gating control signal CGC1 is inputted into the floating point register file 42. The clock gating control signal CGC2 is inputted into the floating point arithmetic slot A 41A, and the clock gating control signal CGC3 is inputted into the floating point arithmetic slot B 41B. Each of the clock gating control signals CGC1, CGC2, CGC3 is at high level when operating the floating point register file 42 or the floating point arithmetic slot 41A, 41B, into which the clock gating control signal CGC1, CGC2, CGC3 is inputted.

Into the state machine unit 71, an instruction processing request signal IREQ and an instruction processing operation code signal IOPC outputted from the instruction issue unit 13 are inputted. The state machine unit 71 controls the state according to the instruction processing request signal IREQ and the instruction processing operation code signal IOPC or the output of the counter unit 73. When the instruction processing request signal IREQ and the instruction processing operation code signal IOPC, for example, relating to the pre-access instruction corresponding to the floating point arithmetic operation instruction are inputted, the state machine unit 71 changes the state into a state where the power saving control over the floating point arithmetic unit 40 is partially invalidated. When the instruction processing request signal IREQ and the instruction processing operation code signal IOPC, for example, relating to the access end instruction corresponding to the floating point arithmetic operation instruction are inputted, the state machine unit 71 changes the state into a state where the power saving control over the floating point arithmetic unit 40 is partially validated.

The power control signal generation unit 72 generates and outputs power control signals PWC1, PWC2, PWC3 according to the output of the state machine unit 71. The power control signal PWC1 is inputted into the floating point register file 42, the power control signal PWC2 is inputted into the floating point arithmetic slot A 41A, and the power control signal PWC3 is inputted into the floating point arithmetic slot B 41B. Each of the power control signals PWC1, PWC2, PWC3 is at high level when causing the floating point register file 42 or the floating point arithmetic slot 41A, 41B, into which the power control signal PWC1, PWC2, PWC3 is inputted, to perform dummy operation for power adjustment. In other words, each of the power control signals PWC1, PWC2, PWC3 is controlled to be activated/inactivated by the pre-access instruction or the access end instruction. The counter unit 73 has, for example, a counter that counts the cycle in which the floating point arithmetic operation instruction is not executed, a counter that counts the elapsed cycles after receiving the pre-access instruction processing request, and so on.

Figure 4:
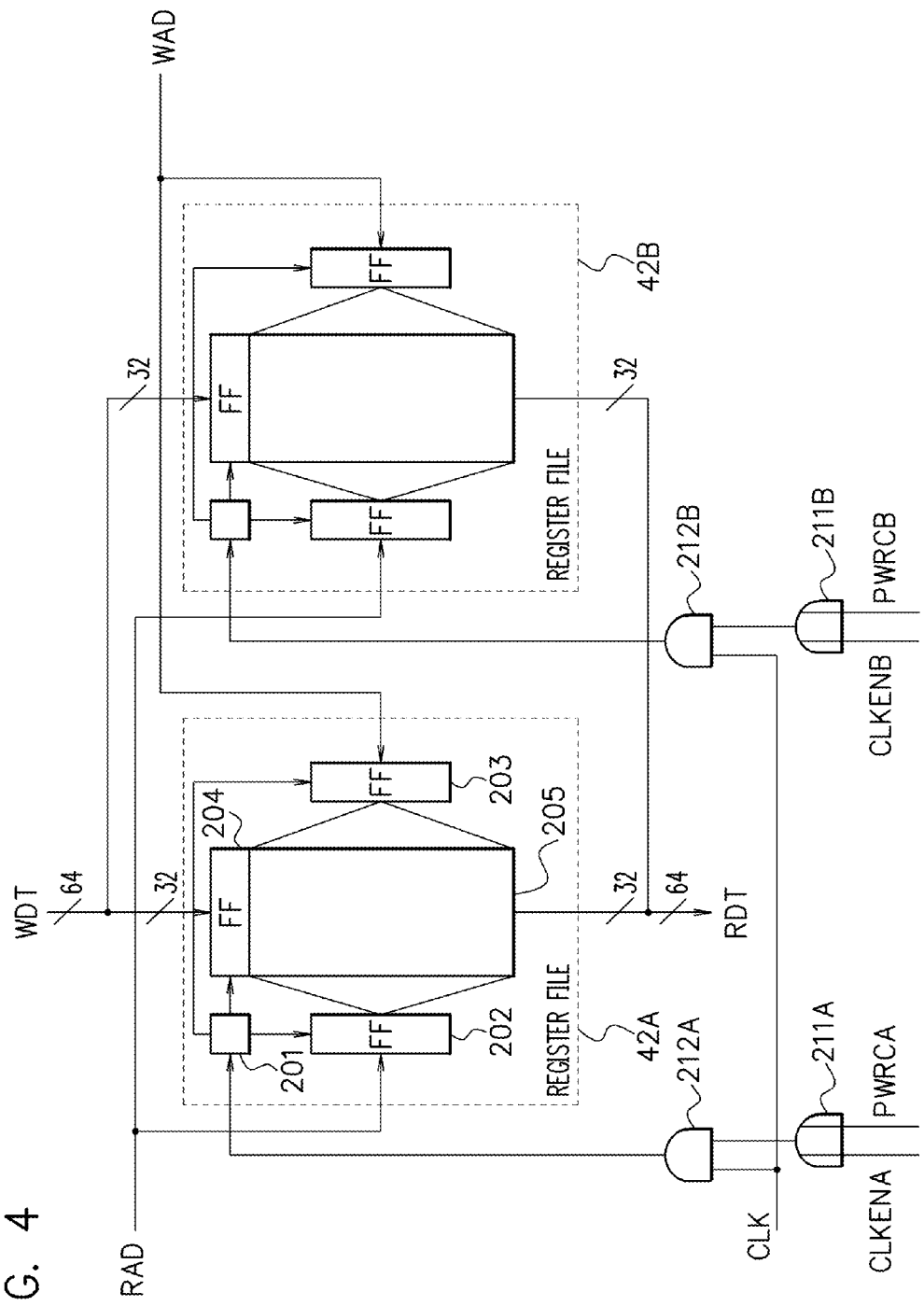
FIG. 4 is a diagram illustrating an example of a clock control over a register file in this embodiment.

FIG. 4 is a diagram illustrating an example of clock control relating to the power control in the register file in this embodiment. FIG. 4 illustrates the example in which the floating point register file 42 has two register file units 42A, 42B that can be individually controlled to be brought into an operation state or a non-operation state.

Each of the register file units 42A, 42B has a clock buffer 201, a flip-flop 202 for read address RAD, a flip-flop 203 for write address WAD, a flip-flop 204 for write data WDT, and a register group 205. To each of the flip-flops 202, 203, 204, a clock is supplied through the clock buffer 201.

A logical sum operation circuit (OR circuit) 211A receives a clock enable signal CLKENA and a power control signal PWRCA corresponding to the register file unit 42A and outputs an operation result thereof. The clock enable signal CLKENA corresponds to the clock gating control signal CGC1 illustrated in FIG. 3, and the power control signal PWRCA is a signal based on the power control signal PWC1 illustrated in FIG. 3. A logical product operation circuit (AND circuit) 212A receives a clock CLK and the output of the OR circuit 211A and outputs an operation result thereof. The output of the AND circuit 212A is inputted into the clock buffer 201 of the register file unit 42A.

Similarly, an OR circuit 211B receives a clock enable signal CLKENB and a power control signal PWRCB corresponding to the register file unit 42B and outputs an operation result thereof. The clock enable signal CLKENB corresponds to the clock gating control signal CGC1 illustrated in FIG. 3, and the power control signal PWRCB is a signal based on the power control signal PWC1 illustrated in FIG. 3. An AND circuit 212B receives the clock CLK and the output of the OR circuit 211B and outputs an operation result thereof. The output of the AND circuit 212B is inputted into the clock buffer 201 of the register file unit 42B.

More specifically, when at least one of the clock enable signal CLKENA and the power control signal PWRCA is at high level, the clock is supplied to the flip-flops 202, 203, 204 of the register file unit 42A. When both of the clock enable signal CLKENA and the power control signal PWRCA are at low level, the supply of the clock to the flip-flops 202, 203, 204 of the register file unit 42A is blocked. Similarly, when at least one of the clock enable signal CLKENB and the power control signal PWRCB is at high level, the clock is supplied to the flip-flops 202, 203, 204 of the register file unit 42B. When both of the clock enable signal CLKENB and the power control signal PWRCB are at low level, the supply of the clock to the flip-flops 202, 203, 204 of the register file unit 42B is blocked.

Here, for example, it is assumed that at execution of the floating point arithmetic operation instruction, both of the clock enable signals CLKENA and CLKENB are set to high level to perform reading and writing of data in the register file units 42A, 42B. It is also assumed that at a power consumption reduced state in the power saving control, both of the clock enable signals CLKENA and CLKENB are set to low level to bring both of the register file units 42A, 42B into a non-operation state.

In this case, when the pre-access instruction corresponding to floating point arithmetic operation instruction is executed, one of the power control signal PWRCA and PWRCB is set to high level to supply the clock to one of the register file units 42A, 42B so as to operate the one, thereby increasing the power consumption. This increases the power consumption relating to the execution of the floating point arithmetic operation instruction stepwise to suppress a rapid current fluctuation, thereby ensuring the power integrity.

When the access end instruction corresponding to the floating point arithmetic operation instruction is executed, one of the power control signal PWRCA and PWRCB is set to high level and the other is set to low level to supply the clock to one of the register file units 42A, 42B so as to operate the one and to block the supply of the clock to the other so as to stop the operation of the other. Thereafter, both of the power control signals PWRCA and PWRCB are set to low level to block the supply of the clock to the register file units 42A, 42B, thereby bringing them into a non-operation state. This decreases the power consumption stepwise after the execution of the floating point arithmetic operation instruction to suppress a rapid current fluctuation, thereby ensuring the power integrity.

FIG. 5 is a diagram illustrating an example of clock control relating to the power control in the arithmetic slots in this embodiment. As illustrated in FIG. 5, each of the floating point arithmetic slots 41A, 41B has a flip-flop 301 for input data (IDA0, IDB0), a flip-flop 302 for input data (IDA1, IDB1), an arithmetic circuit 303, and a flip-flop 304 for output data (ODA, ODB).

An OR circuit 311A receives a clock enable signal CLKENIA and a power control signal PWRCIA corresponding to the floating point arithmetic slot A 41A and outputs an operation result thereof. An AND circuit 312A receives the clock CLK and the output of the OR circuit 311A and outputs an operation result thereof. The output of the AND circuit 312A is inputted, as a clock, into the flip-flops 301, 302 for input data of the floating point arithmetic slot A 41A. Further, an OR circuit 313A also receives a clock enable signal CLKENOA and a power control signal PWRCOA corresponding to the floating point arithmetic slot A 41A and outputs an operation result thereof. An AND circuit 314A receives the clock CLK and the output of the OR circuit 313A and outputs an operation result thereof. The output of the AND circuit 314A is inputted, as a clock, into the flip-flop 304 for output data of the floating point arithmetic slot A 41A. The clock enable signals CLKENIA, CLKENOA correspond to the clock gating control signal CGC2 illustrated in FIG. 3, and the power control signals PWRCIA, PWRCOA correspond to the power control signals PWC2 illustrated in FIG. 3.

More specifically, when at least one of the clock enable signal CLKENIA and the power control signal PWRCIA is at high level, the clock is supplied to the flip-flops 301, 302 for input data of the floating point arithmetic slot A 41A. On the other hand, when both of the clock enable signal CLKENIA and the power control signal PWRCIA are at low level, the supply of the clock to the flip-flops 301, 302 for input data of the floating point arithmetic slot A 41A is blocked. Further, when at least one of the clock enable signal CLKENOA and the power control signal PWRCOA is at high level, the clock is supplied to the flip-flop 304 for output data of the floating point arithmetic slot A 41A. On the other hand, when both of the clock enable signal CLKENOA and the power control signal PWRCOA are at low level, the supply of the clock to the flip-flop 304 for output data of the floating point arithmetic slot A 41A is blocked.

Similarly, an OR circuit 311B receives a clock enable signal CLKENIB and a power control signal PWRCIB corresponding to the floating point arithmetic slot B 41B and outputs an operation result thereof. An AND circuit 312B receives the clock CLK and the output of the OR circuit 311B and outputs an operation result thereof. The output of the AND circuit 312B is inputted, as a clock, into the flip-flops 301, 302 for input data of the floating point arithmetic slot B 41B. Further, an OR circuit 313B receives a clock enable signal CLKENOB and a power control signal PWRCOB corresponding to the floating point arithmetic slot B 41B and outputs an operation result thereof. An AND circuit 314B receives the clock CLK and the output of the OR circuit 313B and outputs an operation result thereof. The output of the AND circuit 314B is inputted, as a clock, into the flip-flop 304 for output data of the floating point arithmetic slot B 41B. The clock enable signals CLKENIB, CLKENOB correspond to the clock gating control signal CGC3 illustrated in FIG. 3, and the power control signals PWRCIB, PWRCOB correspond to the power control signal PWC3 illustrated in FIG. 3.

More specifically, when at least one of the clock enable signal CLKENIB and the power control signal PWRCIB is at high level, the clock is supplied to the flip-flops 301, 302 for input data of the floating point arithmetic slot B 41B. On the other hand, when both of the clock enable signal CLKENIB and the power control signal PWRCIB are at low level, the supply of the clock to the flip-flops 301, 302 for input data of the floating point arithmetic slot B 41B is blocked. Further, when at least one of the clock enable signal CLKENOB and the power control signal PWRCOB is at high level, the clock is supplied to the flip-flop 304 for output data of the floating point arithmetic slot B 41B. On the other hand, when both of the clock enable signal CLKENOB and the power control signal PWRCOB are at low level, the supply of the clock to the flip-flop 304 for output data of the floating point arithmetic slot B 41B is blocked.

Here, for example, it is assumed that at execution of the floating point arithmetic operation instruction, all of the clock enable signals CLKENIA, CLKENOA, CLKENIB and CLKENOB are set to high level to perform the floating point arithmetic operation in the floating point arithmetic slots 41A, 41B. It is also assumed that at a power consumption reduced state in the power saving control, all of the clock enable signals CLKENIA, CLKENOA, CLKENIB and CLKENOB are set to low level to bring both of the floating point arithmetic slots 41A, 41B into the non-operation state.

In this case, when the pre-access instruction corresponding to the floating point arithmetic operation instruction is executed, one of the power control signal PWRCIA and PWRCIB and one of the power control signal PWRCOA and PWRCOB are set to high level. Thus, the clock is supplied to the flip-flops 301, 302 for input data and the flip-flop 304 for output data of one of the floating point arithmetic slots 41A, 41B to operate the one, thereby increasing the power consumption. Consequently, it is possible to increase the power consumption relating to the execution of the floating point arithmetic operation instruction stepwise to suppress a rapid current fluctuation, thereby ensuring the power integrity.

Further, when the access end instruction corresponding to floating point arithmetic operation instruction is executed, one of the power control signal PWRCIA and PWRCIB and one of the power control signal PWRCOA and PWRCOB are set to high level and the others are set to low level. Thus, the clock is supplied to the flip-flops 301, 302 for input data and the flip-flop 304 for output data of one of the floating point arithmetic slots 41A, 41B to operate the one. The supply of the clock to the flip-flops 301, 302 for input data and the flip-flop 304 for output data of the other of the floating point arithmetic slots 41A, 41B is blocked to stop the operation of the other. Thereafter, all of the power control signals PWRCIA, PWRCIB, PWRCOA and PWRCOB are set to low level to block the supply of the clock to all of the flip-flops 301, 302, 304 of the floating point arithmetic slots 41A, 41B, thereby bringing them into the non-operation state. This makes it possible to decrease the power consumption stepwise after the execution of the floating point arithmetic operation instruction to suppress a rapid current fluctuation, thereby ensuring the power integrity.

Figure 6:
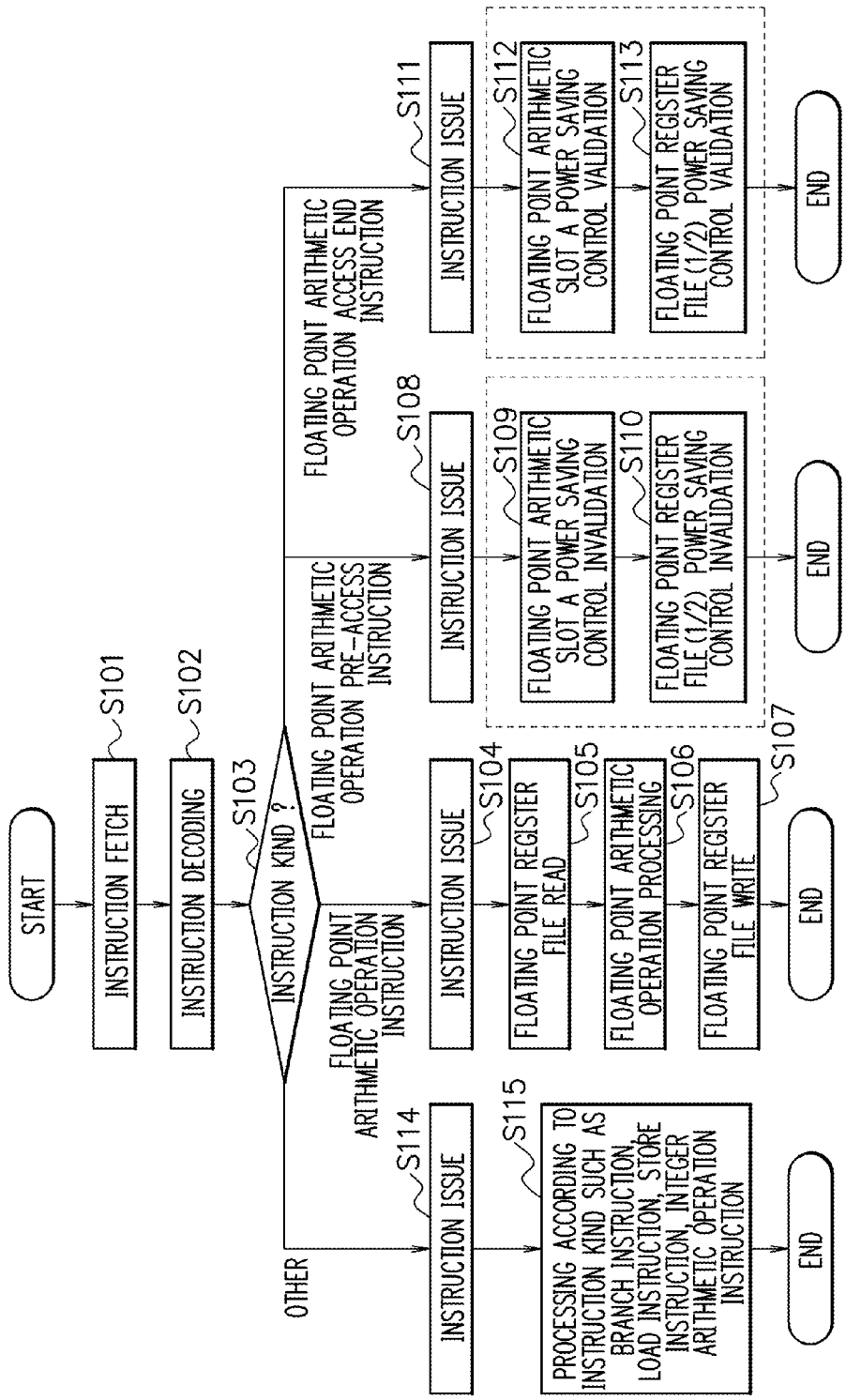
FIG. 6 is a flowchart illustrating an operation example of the semiconductor integrated circuit in this embodiment.

FIG. 6 is a flowchart illustrating an operation example of the processor in this embodiment. Note that both of the floating point arithmetic slots 41A, 41B are used and both of the register file units 42A, 42B of the floating point register file 42 are used for the floating point arithmetic operation instruction in the following explanation. First, the control unit 10 fetches an instruction from the instruction cache memory 21 (S101), and decodes the fetched instruction (S102). Then, the control unit 10 determines the kind of the decoded instruction (S103).

When the instruction is the floating point arithmetic operation instruction as a result of the determination at the step S103, the control unit 10 issues an instruction to the floating point arithmetic unit 40 (S104). The floating point arithmetic unit 40 received the instruction from the control unit 10 reads, according to the instruction, data from the floating point register file 42 (S105), and performs floating point arithmetic operation by the floating point arithmetic slots 41A, 41B (S106). The floating point arithmetic unit 40 then writes operation results by the floating point arithmetic slots 41A, 41B into the floating point register file 42 (S107), and ends the processing.

When the instruction is the pre-access instruction corresponding to the floating point arithmetic operation instruction as the result of the determination at the step S103, the control unit 10 issues an instruction to the power-control instruction control unit 70 (S108). The power-control instruction control unit 70 received the instruction from the control unit 10 sets, according to the instruction, one of the power control signals PWC2, PWC3 to high level to invalidate the power saving control over one of the floating point arithmetic slots 41A, 41B (here, the floating point arithmetic slot A 41A) (S109). The power-control instruction control unit 70 also sets, according to the instruction, the power control signal PWC1 to high level to invalidate the power saving control over one of the register file units 42A, 42B of the floating point register file 42 (S110). This brings one of the floating point arithmetic slots 41A, 41B and one of the register file units 42A, 42B of the floating point register file 42 from the non-operation state into the operation state, thereby increasing the power consumption. Note that the order of execution of the steps S109, S110 is arbitrary, and the step S109 may be executed after the step S110.

When the instruction is the access end instruction corresponding to the floating point arithmetic operation instruction as the result of the determination at the step S103, the control unit 10 issues an instruction to the power-control instruction control unit 70 (S111). The power-control instruction control unit 70 received the instruction from the control unit 10 sets, according to the instruction, one of the power control signals PWC2, PWC3 to low level to validate the power saving control over one of the floating point arithmetic slots 41A, 41B (here, the floating point arithmetic slot A 41A) (S112). The power-control instruction control unit 70 also sets, according to the instruction, the power control signal PWC1 to low level to validate the power saving control over one of the register file units 42A, 42B of the floating point register file 42 (S113). This brings one of the floating point arithmetic slots 41A, 41B and one of the register file units 42A, 42B of the floating point register file 42 into the operation state, thereby preventing the power consumption from rapidly decreasing. Note that the order of execution of the steps S112, S113 is arbitrary, and the step S112 may be executed after the step S113.

When the instruction is another instruction that is not the floating point arithmetic operation instruction, or the pre-access instruction or the access end instruction corresponding to the floating point arithmetic operation instruction as the result of the determination at the step S103, the control unit 10 issues an instruction to a functional unit corresponding to the another instruction (S114). The functional unit received the instruction from the control unit 10 performs, according to the instruction, processing (S115), and ends the processing.

Figure 7:
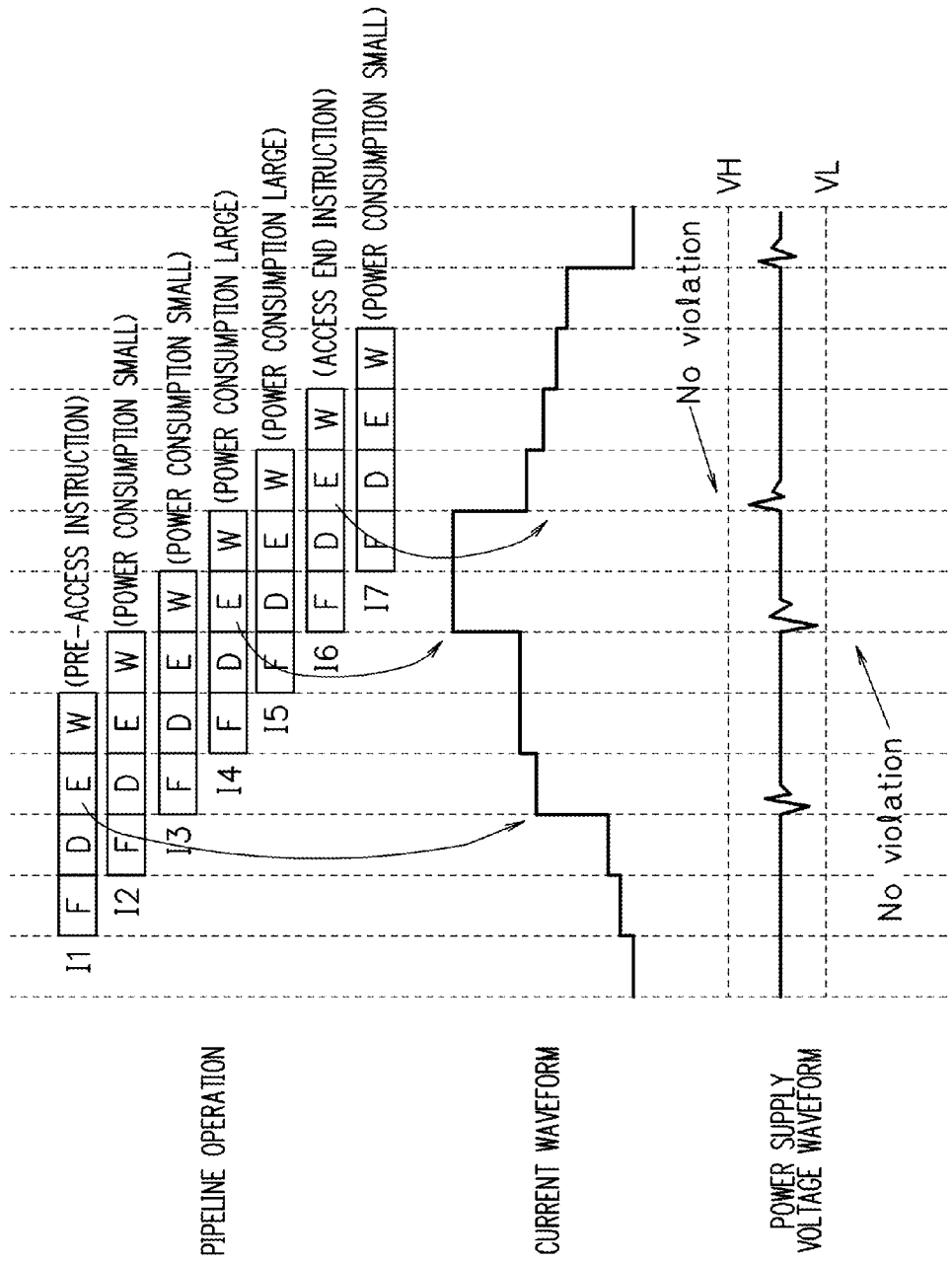
FIG. 7 is a diagram illustrating an example of a pipeline operation in the semiconductor integrated circuit, a current waveform, and a power supply voltage waveform in this embodiment.

FIG. 7 is a diagram illustrating example of a pipeline operation in the processor, a current waveform, and a power supply voltage waveform during the operation in this embodiment. In FIG. 7, a four-stage pipeline operation of an instruction fetch stage F, an instruction decode stage D, an arithmetic operation execution stage E, and a register write stage W is illustrated as an example. Further, in FIG. 7, instructions I4, I5 are instructions with large power consumption (for example, the floating point arithmetic operation instruction), which possibly damage the power integrity, an instruction I1 is the pre-access instruction corresponding to the instructions I4, I5, and an instruction I6 is the access end instruction corresponding to the instructions I4, I5. Further, instructions I2, I3, I7 are instructions with small power consumption (for example, the logical arithmetic operation instruction), which never damage the power integrity.

When the pre-access instruction I1 is executed, hardware previously and gradually releases the power saving control such as the clock gating for the circuit resources and modules to be used at execution of the instructions I4, I5 to increase the power consumption. This suppresses a rapid increase in power consumption when the instructions I4, I5 are executed to prevent occurrence of deterioration in performance while avoiding the damage to the power integrity. For example, not by rapidly releasing the clock gating, but by previously and gradually releasing the clock gating or by releasing the clock gating around an arithmetic circuit or the like to be used, the proportion of the circuit resources and so on performing dummy operation is gradually increased before the execution of the instructions I4, I5. This suppresses a rapid current fluctuation due to an increase in power consumption and suppresses the power supply noise to prevent the power supply voltage from exceeding an allowable upper limit VH and an allowable lower limit VL, thereby ensuring the power integrity. FIG. 7 illustrates a case in which the pre-access instruction I1 is arranged three cycles before the execution of the instruction I4 with large power consumption to increase the power consumption by one stage, but the pre-access instruction may be arranged in a further preceding cycle when needed to increase the power consumption at a plurality of stages. Further, the access end instruction may be similarly arranged to decrease the power consumption stepwise in a much longer cycle.

Figure 8:
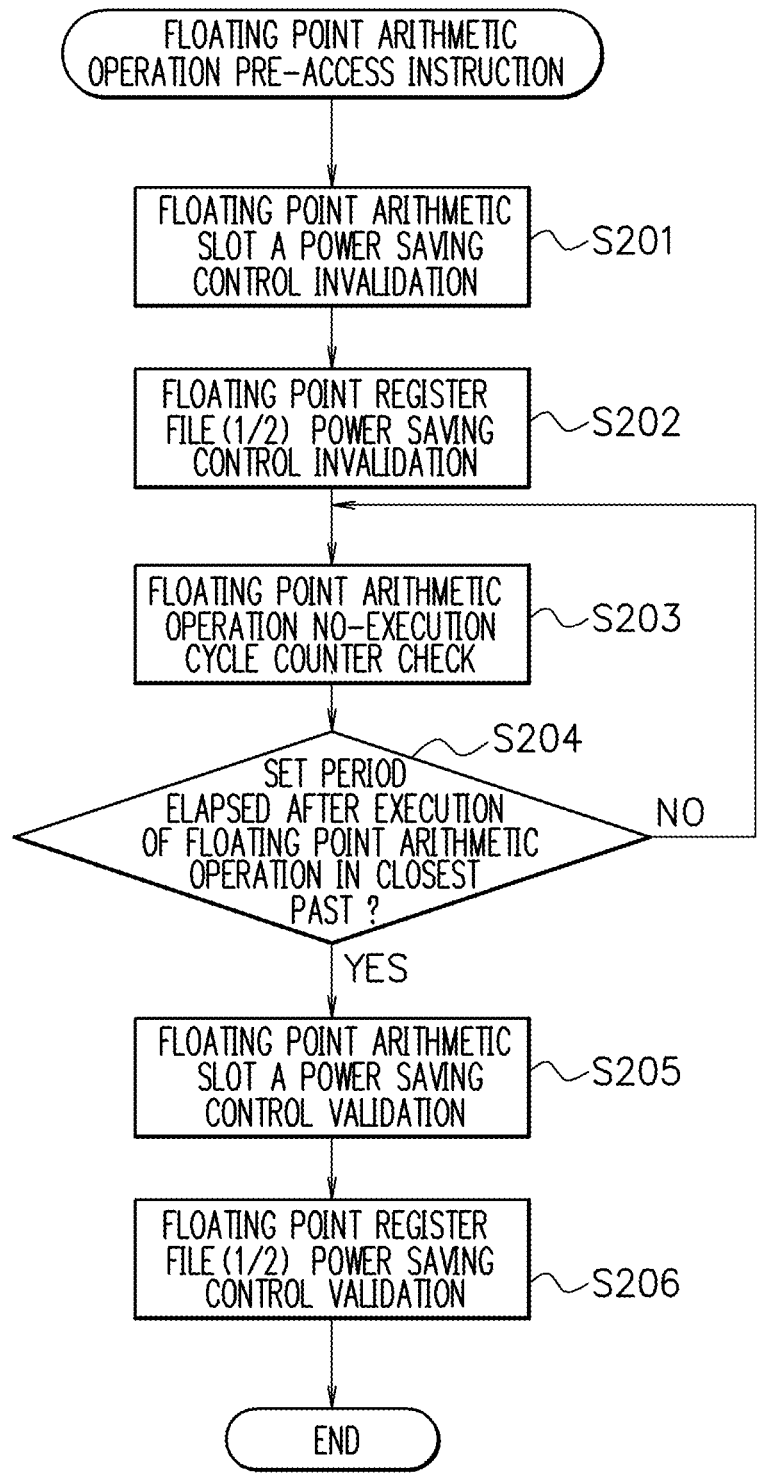
FIG. 8 is a flowchart illustrating another operation example of the semiconductor integrated circuit in this embodiment.

FIG. 8 is a flowchart illustrating another operation example of the processor in this embodiment. The operation example illustrated in FIG. 8 uses only the pre-access instruction without using the access end instruction. When the pre-access instruction corresponding to a certain instruction is detected, the power saving control over the circuit resources to be used for execution of the instruction is invalidated stepwise. Then, after a set period (cycles) is elapsed after the execution of the instruction in the closest past, the power saving control over the circuit resources is validated.

FIG. 8 also illustrates the floating point arithmetic operation instruction, as an example, and it is assumed that both of the floating point arithmetic slots 41A, 41B are used and both of the register file units 42A, 42B of the floating point register file 42 are used for the floating point arithmetic operation instruction. When the pre-access instruction corresponding to floating point arithmetic operation instruction is detected, the power-control instruction control unit 70 sets one of the power control signals PWC2, PWC3 to high level to invalidate the power saving control over one of the floating point arithmetic slots 41A, 41B (here, the floating point arithmetic slot A 41A) (S201). The power-control instruction control unit 70 also sets the power control signal PWC1 to high level to invalidate the power saving control over one of the register file units 42A, 42B of the floating point register file 42 (S202). This brings one of the floating point arithmetic slots 41A, 41B and one of the register file units 42A, 42B of the floating point register file 42 from the non-operation state into the operation state, thereby increasing the power consumption. Note that the order of execution of the steps S201, S202 is arbitrary.

Then, in the power-control instruction control unit 70, the value of the counter that counts the cycles in which the floating point arithmetic operation instruction is not executed is checked (S203). The check of the counter value is repeated until the power-control instruction control unit 70 determines that the set period (cycles) has been elapsed after the execution of the floating point arithmetic operation instruction in the closest past.

When the power-control instruction control unit 70 determines that the set period (cycles) has been elapsed after the execution of the floating point arithmetic operation instruction in the closest past, the power-control instruction control unit 70 sets one of the power control signals PWC2, PWC3 to high level to validate the power saving control over one of the floating point arithmetic slots 41A, 41B (here, the floating point arithmetic slot A 41A) (S205). The power-control instruction control unit 70 also sets the power control signal PWC1 to high level to validate the power saving control over one of the register file units 42A, 42B of the floating point register file 42 (S206). This brings one of the floating point arithmetic slots 41A, 41B and one of the register file units 42A, 42B of the floating point register file 42 into the operation state, thereby preventing the power consumption from rapidly decreasing. Note that the order of execution of the steps S205, S206 is arbitrary.

Figure 9:
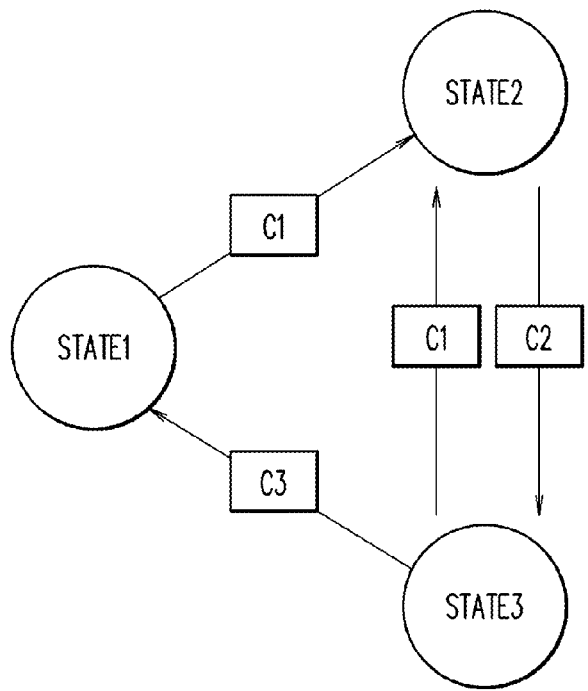
FIG. 9 is a diagram for explaining state transition of the semiconductor integrated circuit in the operation example illustrated in FIG. 8.

FIG. 9 is a diagram illustrating an example of state transition of the pre-access instruction processing corresponding to the operation example illustrated in FIG. 8. The state machine unit 71 of the power-control instruction control unit 70 receives a pre-access instruction processing request (C1) and thereby transits the state from a power saving control valid state (STATE1) to a power saving control invalid state (STATE2). Then, when a set period is elapsed after the reception of the pre-access instruction processing request (C2), the state machine unit 71 transits the state from the power saving control invalid state (STATE2) to a power saving invalid state (STATE3). When a set period is elapsed after the execution of the floating point arithmetic operation instruction in the closest past in the power saving invalid state (STATE3) (C3), the state machine unit 71 transits the state from the power saving invalid state (STATE3) to the power saving control valid state (STATE1). Note that when the pre-access instruction processing request is received in the power saving invalid state (STATE3) (C1), the state machine unit 71 transits the state from the power saving invalid state (STATE3) to the power saving control invalid state (STATE2).

According to this embodiment, it is possible to reduce the decoupling capacitors mounted on the chip, package, board and the like so as to suppress the power supply noise, thereby reducing the cost against the power supply noise to suppress malfunction of the semiconductor integrated circuit at a low cost. It is also possible to decrease the power supply noise generated due to installation of a low power consumption technology such as clock gating so as to achieve the low power consumption of the semiconductor integrated circuit. Further, since the generated power supply noise can be suppressed to be small, the power supply voltage can be made low so as to achieve the low power consumption of the semiconductor integrated circuit.

Note that when an instruction corresponding to a pre-access instruction is issued after execution of the pre-access instruction and before preparation to ensure the power integrity, an exception may be generated to promote a programmer to correct the program in this embodiment. Further, an exception may be generated before the execution of the pre-access instruction, or even after the execution of the pre-access instruction but when the effect of the pre-access instruction is lost to validate the power saving control and then an instruction corresponding to the pre-access instruction is issued. Though the processor that performs power saving control utilizing clock gating is explained as an example in the above description, the power control according to this embodiment is also applicable to the ones that perform power saving control by other techniques such as power gating, chip enable control over a RAM macro and so on.

Figure 10:
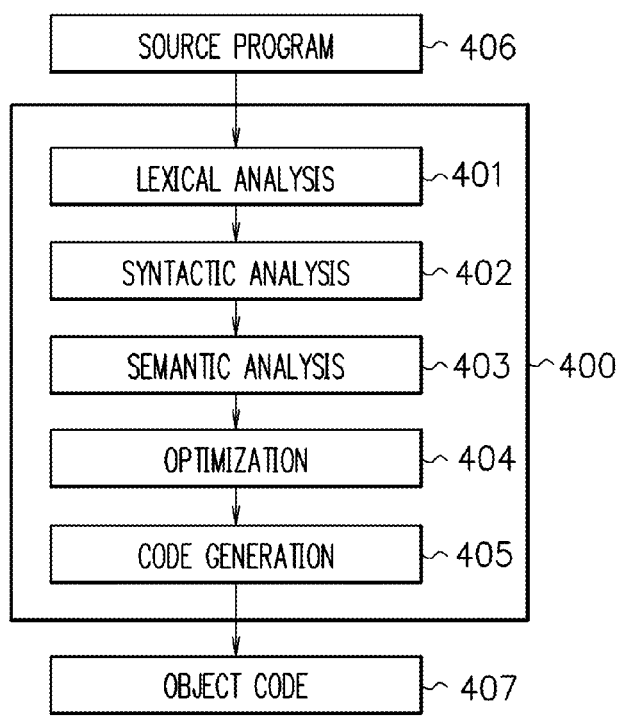
FIG. 10 is a chart illustrating a processing flow of a compiler in this embodiment.

FIG. 10 is a chart illustrating a processing flow of a compiler that is capable of generating the pre-access instruction and the access end instruction in this embodiment. FIG. 11 is a flowchart illustrating a processing example of the compiler in this embodiment. A compiler 400 compiles a source program 406 through execution of a program by the computer to generate an object code 407 in an executable form. The compiler 400 executes lexical analysis processing 401, syntactic analysis processing 402, semantic analysis processing 403, optimization processing 404 and code generation processing 405 for the source program 406 to generate an object code 407.

The lexical analysis processing 401 reads the source program 406 and analyzes a lexis of the source program 406. The syntactic analysis processing 402 analyzes the syntax of the source program 406 on the basis of a result of the lexical analysis of the source program 406 in the lexical analysis processing 401. The semantic analysis processing 403 analyzes the semantics of the source program 406 analyzed in the syntactic analysis processing 402. The optimization processing 404 performs optimization on the basis of the analyzed result in the semantic analysis processing 403. The code generation processing 405 generates the object code 407 in the executable form of the source program 406 using the results of the optimization processing 404 and so on.

The compiler in this embodiment has the following steps for inserting the pre-access instruction and the access end instruction into the code. The compiler includes, in the code generation processing, a step of detecting the floating point arithmetic operation instruction (an instruction with large power consumption) (S301), and a step of inserting a pre-access instruction corresponding to the floating point arithmetic operation instruction into a pass before the floating point arithmetic operation instruction (S302) as illustrated in FIG. 11. In this event, when there is a label before the floating point arithmetic operation instruction, the pre-access instruction is inserted to every pass blanched off to the label.

The compiler may further grasp the number of floating point arithmetic circuits (circuit resources with large power consumption) which are provided in the processor and can be simultaneously used, and insert the pre-access instruction only when the number of arithmetic circuits to be used is equal to or more than the number that possibly damages the power integrity. For example, in a processor having two floating point arithmetic slots (arithmetic circuits), when only one of the floating point arithmetic slots is used, there is no need to start the dummy operation, so that the waste power consumption can be suppressed.

Further, the compiler includes, in the code generation processing, the step of detecting the floating point arithmetic operation instruction (S301), and a step of detecting the interval between floating point arithmetic operation instructions and inserting an access end instruction after the floating point arithmetic operation instruction when the interval is equal to or more than a set value (S303) as illustrated in FIG. 11. The compiler in this embodiment performs, in the code generation processing, the detection of the floating point arithmetic operation instruction to perform the above-described processing until the generation of the instruction code is completed (S304).

The disclosed semiconductor integrated circuit can operate a part of circuit resources to be used in processing according to a first instruction by a second instruction corresponding to the first instruction so as to previously increase the power consumption, thereby suppressing occurrence of a rapid current fluctuation at a low cost and suppressing malfunction due to power supply noise.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor integrated circuit, comprising:
   an arithmetic unit that executes processing according to an instruction and includes a plurality of circuit resources over which power saving control relating to reduction in power consumption is performed;
   a first control unit that receives a second instruction executed prior to execution of a first instruction, the second instruction being corresponding to the first instruction for which processing is executed using the circuit resources of the arithmetic unit, and operates a part of the circuit resources to be used in the processing according to the first instruction when the second instruction is received; and
   a second control unit that receives the first instruction and causes the arithmetic unit to execute the processing according to the first instruction.

2. The semiconductor integrated circuit according to claim 1,
   wherein the first control unit receives a third instruction corresponding to the first instruction and stops operations of the part of the circuit resources that are operating according to the reception of the first instruction when the third instruction is received.

3. The semiconductor integrated circuit according to claim 1,
wherein the first control unit includes a counter unit that counts a number of elapsed cycles after the processing according to the first instruction is executed in the arithmetic unit, and
wherein when the number of elapsed cycles counted by the counter unit is equal to or more than a set number of cycles, the first control unit stops operations of the part of the circuit resources that are operating according to the reception of the first instruction.

4. The semiconductor integrated circuit according to claim 1,
wherein the second instruction includes information that designates the circuit resources that are operated by the second instruction, and
wherein the first control unit operates the designated circuit resources among the plurality of circuit resources according to the received second instruction.

5. The semiconductor integrated circuit according to claim 2,
wherein the second instruction includes information that designates the circuit resources that are operated by the second instruction,
wherein the first control unit operates the designated circuit resources among the plurality of circuit resources according to the received second instruction,
wherein the third instruction includes information that designates the circuit resources whose operations are stopped by the third instruction, and
wherein the first control unit stops the operations of the designated circuit resources among the plurality of circuit resources according to the received third instruction.

6. A non-transitory computer-readable medium storing a program causing a computer to execute a process, the process comprising:
reading a source program;
lexis analyzing a lexis of the source program;
syntax analyzing a syntax of the source program based on an analysis result in the lexis analyzing;
semantics analyzing semantics of the source program analyzed in the syntax analyzing;
performing optimization based on an analysis result in the semantics analyzing; and
code generating an object code in an executable form using a result of the performing optimization,
the code generating including:
detecting a first instruction for which processing is executed using a plurality of circuit resources, of an arithmetic unit included in a semiconductor integrated circuit, over which power saving control relating to reduction in power consumption is performed; and
inserting, before the first instruction, a second instruction that operates a part of the circuit resources to be used in the processing according to the first instruction.

7. The non-transitory computer-readable medium according to claim 6,
wherein the code generating includes:
detecting an interval between preceding first instruction and following first instruction; and
inserting, after the preceding first instruction, a third instruction that stops operations the part of the circuit resources that operate in the processing according to the preceding first instruction when the interval is equal to or more than a set value.

* * * * *